United States Patent
Chuang

(10) Patent No.: US 11,566,702 B2
(45) Date of Patent: Jan. 31, 2023

(54) DERAILLEUR SHIFTING SYSTEM

(71) Applicant: TEKTRO TECHNOLOGY CORPORATION, Changhua County (TW)

(72) Inventor: Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 234 days.

(21) Appl. No.: 17/086,690

(22) Filed: Nov. 2, 2020

(65) Prior Publication Data

US 2021/0172516 A1 Jun. 10, 2021

(30) Foreign Application Priority Data

Dec. 4, 2019 (TW) ................................. 108144316

(51) Int. Cl.
  *F16H 61/02* (2006.01)
  *B62M 25/08* (2006.01)
  *B62M 9/12* (2006.01)
(52) U.S. Cl.
  CPC ........... *F16H 61/0213* (2013.01); *B62M 9/12* (2013.01); *B62M 25/08* (2013.01); *F16H 2061/0223* (2013.01)
(58) Field of Classification Search
  CPC ........ F16H 61/0213; F16H 2061/0223; B62M 9/12; B62M 25/08
  See application file for complete search history.

(56) References Cited

U.S. PATENT DOCUMENTS

| | | | | |
|---|---|---|---|---|
| 2008/0272560 | A1* | 11/2008 | Voss | B60L 50/20 280/5.5 |
| 2013/0054102 | A1* | 2/2013 | Cheng | B62M 9/123 701/55 |
| 2016/0031527 | A1* | 2/2016 | Bortolozzo | B62M 9/133 701/58 |
| 2020/0262516 | A1* | 8/2020 | Hahn | B62M 6/45 |

* cited by examiner

*Primary Examiner* — Edwin A Young
(74) *Attorney, Agent, or Firm* — Locke Lord LLP; Tim Tingkang Xia, Esq.

(57) ABSTRACT

A derailleur shifting system comprise a front derailleur, a rear derailleur, an operating device and a controller. The front derailleur is configured to be controlled to shift among front gear positions. The rear derailleur is configured to be controlled to shift among rear gear positions. The operating device is configured to generate an operational instruction associated with one or both of the front derailleur and the rear derailleur. The controller is configured to control one or both of the front derailleur and the rear derailleur to shift according to the operational instruction, an estimated gear position table and a gear position control table. The estimated gear position table comprises an estimated front gear position of the front derailleur and an estimated rear gear position of the rear derailleur, and the gear position control table comprises matching relationships between the front gear positions and the rear gear positions.

24 Claims, 9 Drawing Sheets

DERAILLEUR SHIFTING SYSTEM

CROSS-REFERENCE TO RELATED APPLICATIONS

This non-provisional application claims priority under 35 U.S.C. § 119(a) on Patent Application No(s). 108144316 filed in Taiwan (R.O.C.) on Dec. 4, 2019, the entire contents of which are hereby incorporated by reference.

BACKGROUND

1. Technical Field

This disclosure relates to a derailleur shifting system, and particularly to a derailleur shifting system applied to a bicycle.

2. Related Art

In the conventional mechanical speed change system, the gear ratio is changed by manually pulling a shift cable. After long-term use, it must cause problems such as the tension of the shift cable and even the damage of the shift cable. Therefore, with the development of electronic control technology, an electronic speed change system was invented. By using electronic signals to control the gear positions of derailleurs, the smoothness and stability of shifting are improved.

However, in the existing electronic derailleur shifting system and method, when an operator inputs an operational instruction for shifting, a controller in the system will ask the derailleur for the actual gear position of the derailleur or wait for the derailleur to return the actual gear position, and accordingly control the derailleur to shift. As a result, the control of the gear position cannot be real-time, and when the gear position detector that detects the actual gear position is abnormal, the system cannot provide the gear position control corresponding to the operational instruction.

SUMMARY

Accordingly, this disclosure provides a derailleur shifting system.

According to an embodiment of this disclosure, a derailleur shifting system comprise a front derailleur, a rear derailleur, an operating device and a controller, wherein the controller is connected with the operating device, the front derailleur and the rear derailleur. The front derailleur is configured to be controlled to shift among a plurality of front gear positions. The rear derailleur is configured to be controlled to shift among a plurality of rear gear positions. The operating device is configured to generate an operational instruction associated with one or both of the front derailleur and the rear derailleur. The controller is configured to control one or both of the front derailleur and the rear derailleur to shift according to the operational instruction, an estimated gear position table and a gear position control table. The estimated gear position table comprises an estimated front gear position of the front derailleur and an estimated rear gear position of the rear derailleur, and the gear position control table comprises matching relationships between the plurality of front gear positions of the front derailleur and the plurality of rear gear positions of the rear derailleur.

According to another embodiment of this disclosure, a derailleur shifting system comprises a front derailleur, a rear derailleur, an operating device and a controller, wherein the controller is connected with the operating device, the front derailleur and the rear derailleur. The front derailleur is configured to be controlled to shift among a plurality of front gear positions. The rear derailleur is configured to be controlled to shift among a plurality of rear gear positions. The operating device is configured to generate an operational instruction associated with one or both of the front derailleur and the rear derailleur. The controller is configured to generate a first control signal and a second control signal, to transmit the first control signal to the front derailleur, and to transmit the second control signal to the rear derailleur, wherein the first control signal is associated with the second control signal.

In view of the above statement, when the derailleur shifting system provided in this disclosure receives an operational instruction, it may immediately refer to the matching relationships between the front gear positions and the rear gear positions to control the front derailleur and/or the rear derailleur to shift, without waiting for the rear derailleur to return the actual gear position. Therefore, it may achieve a real-time gear position control, and avoid chain wear caused since the rear derailleur shifts first and then returns the actual gear position.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
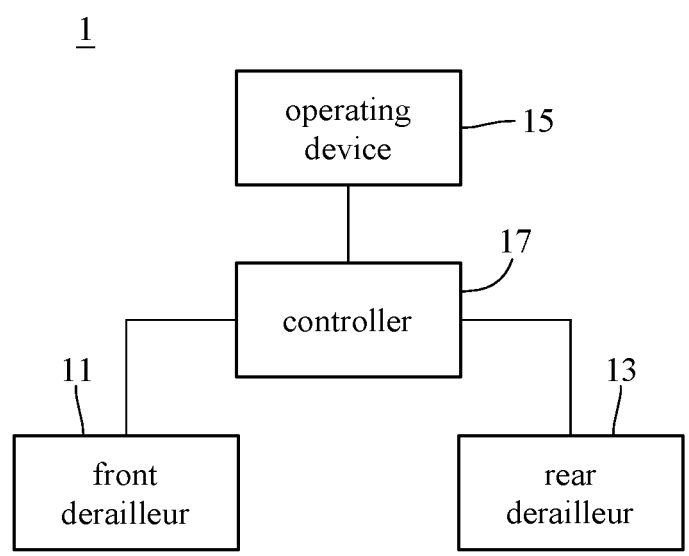
FIG. 1 is a functional block diagram of a derailleur shifting system according to an embodiment of this disclosure.

Please refer to FIG. 1 that is a functional block diagram of a derailleur shifting system according to an embodiment of this disclosure. As shown in FIG. 1, a derailleur shifting system 1, also referred to as speed change system, comprises a front derailleur 11, a rear derailleur 13, an operating device 15 and a controller 17, wherein the controller 17 is connected with the front derailleur 11, the rear derailleur 13 and the operating device 15, and the connections between these devices can each be wireless or wired. More particularly, one or more of these devices can each have a wireless signal transceiver, and the wireless signal transceiver of the controller 17 can have a communication connection with the wireless signal transceiver of other device. For example, the wireless signal transceiver can be a device using infrared communication technology (e.g. RC-5, VFIR, UFIR, etc.), Bluetooth, Bluetooth Low Energy, ZigBee, ANT, wireless LAN, etc.

The front derailleur 11, also referred to as front speed changer, comprises at least a derailing component and can be controlled to shift among a number of front gear positions. The rear derailleur 13, also referred to as rear speed changer, comprises at least a derailing component and can be controlled to shift among a number of rear gear positions. The structures of the derailing components included in the front derailleur 11 and the rear derailleur 13 are not limited in this disclosure, and they are known to a person having ordinary skill in the art, so they are not described in detail here. The operating device 15 is configured to generate an operational instruction associated with one or both of the front derailleur 11 and the rear derailleur 13. The controller 17 can control one or both of the front derailleur 11 and the rear derailleur 13 to shift according to the operational instruction and the information stored inside, or capture the shifting information contained in the operational instruction as two control signals directly or after initially processed, and transmit the two control signals to the front derailleur 11 and the rear derailleur 13 respectively. The detailed control method is described later.

The derailleur shifting system 1 can be applied to a bicycle that comprises a left handlebar, a right handlebar, a sprocket group, a cogset and a chain. In an embodiment, the sprocket group can comprise a first sprocket and a second sprocket that have different radii and, for example, called small chainring and large chainring; the cogset can comprises sprockets that have different radii; the chain is connected between the sprocket group and the cogset, and can be controlled by the front derailleur 11 to switch to mesh with the first sprocket or the second sprocket of the sprocket group, and controlled by the rear derailleur 13 to switch to mesh with one of the sprockets of the cogset.

Figure 2:
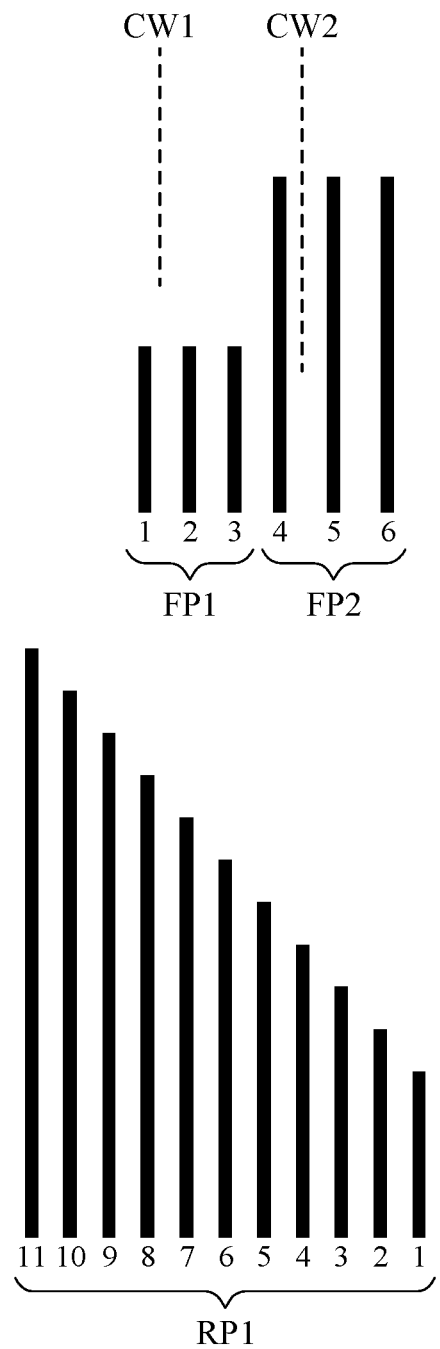
FIG. 2 is a schematic diagram of gear positions of a derailleur shifting system according to an embodiment of this disclosure.

Please refer to FIG. 1 and FIG. 2 together for a further explanation of the front gear positions of the front derailleur 11 and the rear gear positions of the rear derailleur 13, wherein FIG. 2 is a schematic diagram of gear positions of the derailleur shifting system 1 according to an embodiment of this disclosure, and exemplarily shows the relative positions of the front gear positions of the front derailleur 11 and the rear gear positions of the rear derailleur 13 of the derailleur shifting system 1. As shown in FIG. 2, the front gear positions of the front derailleur 11 can comprise first gear positions FP1 and second first gear positions FP2, wherein the first gear positions FP1 belongs to the first sprocket CW1 of the bicycle where the derailleur shifting system 1 disposed and the second first gear positions FP2 belongs to the second sprocket CW2 of the bicycle. More particularly, the first gear positions FP1 (front gear positions 1-3) represent fine-tuning positions as the chain is controlled by the front derailleur 11 to mesh with the first sprocket CW1, and the second gear positions FP2 (front gear positions 4-6) represent fine-tuning positions as the chain is controlled by the front derailleur 11 to mesh with the second sprocket CW2. The rear gear positions of the rear derailleur 13 can comprise gear positions RP1 that can be respectively called rear gear positions 1-11 and respectively correspond to the sprockets of the cogset (not shown in the figure), especially have a one-to-one relationship with the sprockets. The number of the sprockets included in the sprocket group and the number of the front and rear gear positions shown in FIG. 2 are merely examples. In other embodiments, the sprocket group can include more than two sprockets, and each sprocket can correspond to two or more than three front gear positions of the front derailleur 11, which are not limited in this disclosure.

In an embodiment, the operating device 15 can comprise two speed change trigger components such as grip shifters, road bike shifters, etc., and the two speed change trigger components respectively correspond to the front derailleur 11 and the rear derailleur 13 and can respectively generate the operational instruction associated with the front derailleur 11 and the operational instruction associated with the rear derailleur 13. The two speed change trigger components can be respectively disposed on/in the left handlebar and the right handlebar of the bicycle, or disposed on/in the left handlebar or the right handlebar together, which is not limited in this disclosure. In another embodiment, the operating device 15 can comprise a touch panel or physical buttons for a user to input the operational instruction associated with one or both of the front derailleur 11 and the rear derailleur 13. The touch panel or the physical buttons can be disposed on/in the stem of bicycle or other areas that are convenient for the user to operate, which is not limited in this disclosure.

The operational instruction generated by the operating device 15 can comprise shifting information associated with the front derailleur 11, the rear derailleur 13 or both of them. More particularly, the shifting information associated with the front derailleur 11 can comprise the information of a specified target sprocket. In the embodiment where the sprocket group comprises the first and second sprockets as aforementioned, the target sprocket can be the first sprocket or the second sprocket. Or, the shifting information associated with the front derailleur 11 can comprise a sprocket switching instruction, for example, instructing the chain to switch to mesh with the previous sprocket or take two sprockets back, etc. On the other hand, the shifting information associated with the rear derailleur 13 can comprise a specified target rear gear position (e.g. the information specifying rear gear position 5) or a rear gear position switching instruction (e.g. the instruction indicating taking one gear position forward or two gear positions backward).

The controller 17 can be disposed on/in the handlebar, the stem or other positions of the bicycle. In particular, the controller 17 and the operating device 15 can be integrated and disposed on/in the handlebar of the bicycle. Moreover, the controller 17 can be disposed on/in the sprocket group or the cogset. In particular, the controller 17 can be integrated with the front derailleur 11 and disposed on/in the frame near the sprocket group of the bicycle, or integrated with the rear derailleur 13 and disposed on/in the frame near the cogset of the bicycle. Moreover, the controller 17 can be integrated with the seat tube battery of the bicycle. For example, an embedded controller (EC), a micro control unit (MCU) or an application-specific integrated circuit (ASIC) is adopted as the controller 17, but the hardware type of the controller 17 is not limited to these. As above-mentioned, the controller 17 can control one or both of the front derailleur 11 and the rear derailleur 13 to shift according to the operational instruction and the information stored inside, and in the embodiment using this shifting control method, the information stored inside can be stored in a non-volatile memory built in the controller 17 or a non-volatile memory connected with the controller in the system. The information stored inside can comprise an estimated gear position table and a gear position control table.

The estimated gear position table comprises an estimated front gear position of the front derailleur 11 and an estimated rear gear position of the rear derailleur 13. More particularly, the estimated front gear position and the estimated rear gear position can each be set to a default value when the system leaves the factory, and respectively represent the gear positions of the front derailleur 11 and the rear derailleur 13 that are preset when the system leaves the factory. The controller 17 can change the values of the estimated front gear position and the estimated rear gear position according to the user's operation after leaving the factory. The gear position control table comprises matching relationships between the front gear positions of the front derailleur 11 and the rear gear positions of the rear derailleur 13. More particularly, the matching relationships indicate the combinations of the front gear positions and the rear gear positions that do not cause chain wear. Please refer to FIG. 2 and Table 1 together, wherein Table 1 exemplarily shows the gear position control table. The gear position control table as shown by Table 1 corresponds to the schematic diagram of gear positions as shown by FIG. 2, wherein front gear positions 1-3 (numbered in the order of the first gear position FP1 far from the second first gear position FP2 to the first gear position FP1 near the second first gear position FP2 in FIG. 2) correspond to the first sprocket CW1 with the smaller radius in the sprocket group of the bicycle, and front gear positions 4-6 (numbered in the order of the second first gear position FP2 far from the first gear position FP1 to the second first gear position FP2 near the first gear position FP1 in FIG. 2) correspond to the second sprocket CW2 with the larger radius in the sprocket group; rear gear positions 1-11 (numbered in the order from the shortest gear position RP1 to the longest gear position RP1) respectively correspond to the sprockets of the cogset in the order of the sprocket with the smallest radius to the sprocket with the largest radius. In other words, rear gear position 1 corresponds to the sprocket with the smallest radius in the cogset, and rear gear position 11 corresponds to the sprocket with the largest radius in the cogset. It should be noted that Table 1 is merely an example. In other embodiments, each sprocket in the sprocket group can correspond to two or more than three front gear positions, and the matching rear gear positions can be set according to the actual mechanism design.

TABLE 1

| Front gear position | Rear gear position |
| --- | --- |
| 1 | 11, 10, 9, 8, 7 |
| 2 | 6, 5, 4 |
| 3 | 3, 2, 1 |
| 4 | 11, 10, 9, 8, 7 |

TABLE 1-continued

| Front gear position | Rear gear position |
| --- | --- |
| 5 | 6, 5, 4 |
| 6 | 3, 2, 1 |

Figure 3:
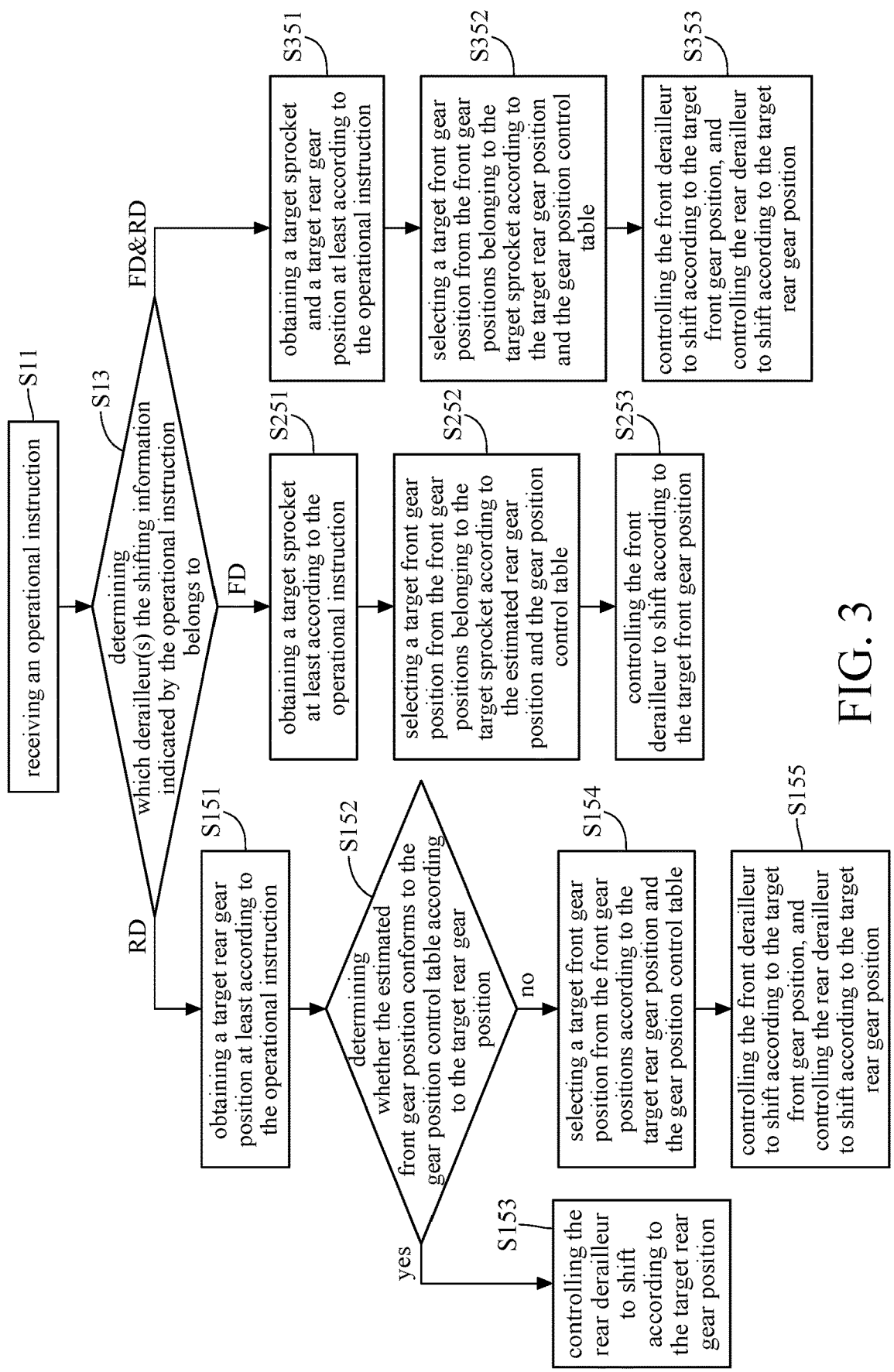
FIG. 3 is a flow chart of a method for controlling gear positions of derailleurs according to an embodiment of this disclosure.

For a further explanation of the method used by the controller 17 to control gear shifting according to the operational instruction and the information stored inside, please refer to FIG. 1, FIG. 3 and Table 1 together, wherein FIG. 3 is a flow chart of a method for controlling gear positions of derailleurs according to an embodiment of this disclosure. The controller 17 can perform the control method shown in FIG. 3. In steps S11 and S13 in FIG. 3, the controller 17 receives an operational instruction from the operating device 15, and determines whether the operational instruction indicates shifting information of the front derailleur 11, the rear derailleur 13, or both of them. For different determined results, the controller 17 can perform different control procedures correspondingly. As shown in FIG. 3, when the operational instruction indicates the shifting information of the rear derailleur 13 (determined result RD), the corresponding control procedure can comprise steps S151-S155; when the operational instruction indicates the shifting information of the front derailleur 11 (determined result FD), the corresponding control procedure can comprise steps S251-S253; and when the operational instruction indicates the shifting information of both the front derailleur 11 and the rear derailleur 13 (determined result FD&RD), the corresponding control procedure can comprise steps S351-S353. Each of these control procedures is further described in the following.

In step S151 in the control procedure corresponding to the shifting information of the rear derailleur 13, the controller 17 can obtain a target rear gear position at least according to the operational instruction. As aforementioned, the shifting information of the rear derailleur 13 can comprise a specified target rear gear position or a rear gear position switching instruction. When the operational instruction indicates a target rear gear position, the controller 17 can obtain the target rear gear position therefrom. When the operational instruction indicates a rear gear position switching instruction, the controller 17 can obtain the target rear gear position according to this rear gear position switching instruction and the estimated rear gear position (i.e. the current rear gear position of the rear derailleur 13 considered by the controller 17) in the estimated gear position table. For example, when the operational instruction instructs the rear derailleur 13 to shift to the next gear position and the estimated rear gear position indicates rear gear position 3, the controller 17 considers rear gear position 4 to be the target rear gear position.

In step S152, the controller 17 determines whether the estimated front gear position in the estimated gear position table conforms to the gear position control table according to the target rear gear position. More specifically, the controller 17 can search for the front gear position that has a matching relationship with the rear gear position indicated by the target rear gear position, and determine whether the estimated front gear position (i.e. the current front gear position of the front derailleur 11 considered by the controller 17) is the searched front gear positions. When the determined result is positive ("yes"), indicating that the estimated front gear position matches the target rear gear position, the controller 17 controls the rear derailleur 13 to shift according to the target rear gear position (step S153)

without adjusting the front gear position. When the determined result is negative ("no"), the controller 17 selects a target front gear position from the front gear positions according to the target rear gear position and the gear position control table (step S154). In the example using Table 1 as the gear position control table, when the estimated rear gear position of the rear derailleur 13 is rear gear position 3 and the target rear gear position determined according to the operational instruction by the controller 17 is rear gear position 4, since rear gear position 3 and rear gear position 4 match different front gear positions, the controller 17 determines that the estimated front gear position (front gear position 3 or 6) does not conform to the gear position control table, and selects front gear position 2 or 5 that matches rear gear position 4 to be the target front gear position. In particular, the controller preferably selects the front gear position that belongs to the same sprocket as the estimated front gear position to be the target front gear position. In the above example, when the estimated front gear position is front gear position 3 originally, the controller 17 selects front gear position 2 to be the target front gear position.

In step S155, the controller 17 controls the front derailleur 11 to shift according to the selected target front gear position, and controls the rear derailleur 13 to shift according to the target rear gear position obtained from the operational instruction. The control signal used by the controller 17 to control the derailleur to shift can indicate a specified gear position or the number of gear positions for shifting forward or backward, which is not limited in this disclosure.

In the control procedure corresponding to the shifting information of the front derailleur 11, the controller 17 can obtain a target sprocket at least according to the operational instruction (step S251). As aforementioned, the shifting information of the front derailleur 11 can comprise a specified target sprocket or a sprocket switching instruction. When the operational instruction indicates a target sprocket, the controller 17 can obtain the target sprocket therefrom. When the operational instruction indicates a sprocket switching instruction, the controller 17 can obtain the target sprocket according to this sprocket switching instruction and the estimated front gear position (i.e. the current front gear position of the front derailleur 11 considered by the controller 17) in the estimated gear position table. In the example where the sprocket group has the first and second sprockets as aforementioned, when the operational instruction instructs the front derailleur 11 to switch to another sprocket and the estimated front gear position indicates front gear position 3, the controller 17 determines that the target sprocket indicates the second sprocket since front gear position 3 belongs to the first sprocket.

In step S252, the controller 17 selects a target front gear position from the front gear positions belonging to the target sprocket according to the estimated rear gear position and the gear position control table. More specifically, the controller 17 searches for the front gear position that belongs to the target sprocket and has a matching relationship with the estimated rear gear position from the gear position control table, and sets this front gear position as the target front gear position. In the example using Table 1 as the gear position control table, if the estimated rear gear position is rear gear position 3 and the controller 17 determines that the target sprocket is the second sprocket in step S251, the controller 17 can select the front gear position that has a matching relationship with rear gear position 3 from front positions 4-6, which belonging to the second sprocket. That is, front gear position 6 is selected. In step S253, the controller 17 can control the front derailleur 11 to shift according to the selected target front gear position. The control signal used by the controller 17 to control the front derailleur 11 to shift can indicate a specified front gear position or the number of gear positions for shifting forward or backward, which is not limited in this disclosure.

In the control procedure corresponding to the shifting information of the front derailleur 11 and the rear derailleur 13, the controller 17 can obtain a target sprocket and the target rear gear position at least according to the operational instruction (step S351). As aforementioned, the shifting information of the front derailleur 11 can indicate a specified target sprocket or a sprocket switching instruction, and the shifting information of the rear derailleur 13 can indicate a specified target rear gear position or a rear gear position switching instruction. More specifically, when the shifting information of the front derailleur 11 in the operational instruction indicates a target sprocket, the controller 17 can obtain the target sprocket therefrom; when the shifting information of the front derailleur 11 in the operational instruction indicates a sprocket switching instruction, the controller 17 can obtain the target sprocket according to this sprocket switching instruction and the estimated front gear position in the estimated gear position table; when the shifting information of the rear derailleur 13 in the operational instruction indicates a target rear gear position, the controller 17 can obtain the target rear gear position therefrom; and when the shifting information of the rear derailleur 13 in the operational instruction indicates a rear gear position switching instruction, the controller 17 can obtain the target rear gear position according to this rear gear position switching instruction and the estimated rear gear position in the estimated gear position table. The examples of obtaining the target sprocket/target rear gear position according to the switching instruction and the estimated gear position table have the same principles as the examples listed in the description of the above two control procedures, so they are not repeated here.

In step S352, the controller 17 selects a target front gear position from the front gear positions belonging to the target sprocket according to the target rear gear position and the gear position control table. More specifically, the controller 17 searches for the front gear position that belongs to the target sprocket and has a matching relationship with the target rear gear position from the gear position control table, and sets this front gear position as the target front gear position. In the example using Table 1 as the gear position control table, if the target sprocket determined in step S351 is the second sprocket and the target rear gear position is rear gear position 3, the controller 17 can select the front gear position that has a matching relationship with rear gear position 3 from front positions 4-6, which belonging to the second sprocket. That is, front gear position 6 is selected. In step S353, the controller 17 controls the front derailleur 11 to shift according to the target front gear position, and controls the rear derailleur 13 to shift according to the target rear gear position. The control signal used by the controller 17 to control the derailleur shift can indicate a specified gear position or the number of gear positions for shifting forward or backward, which is not limited in this disclosure.

It should be noted that although the above embodiment exemplarily describes that the controller 17 can perform three types of control procedures, in other embodiments, the controller 17 can be set to merely perform one or two of the three types of control procedures. In other words, the controller 17 can merely be triggered by one or two types of operational instructions to perform the control procedure. In an embodiment where merely one type of control procedure can be performed, the controller 17 does not perform the aforementioned determining step S13 but performs a step of determining whether the operational instruction comprises the shifting information corresponding to the control procedure. The controller 17 performs the control procedure when the determined result is positive, and does nothing when the determined result is negative.

In the above embodiments, the controller 17 determines the operation object indicated by the operational instruction first and then performs the corresponding control procedure. In another embodiment, the controller 17 can modify the estimated gear position table according to the operational instruction first, and then determine the object to be controlled to shift. Please refer to FIG. 1, FIG. 4 and Table 1 as above listed, wherein FIG. 4 is a flow chart of a method for controlling gear positions of derailleurs according to another embodiment of this disclosure.

Figure 4:
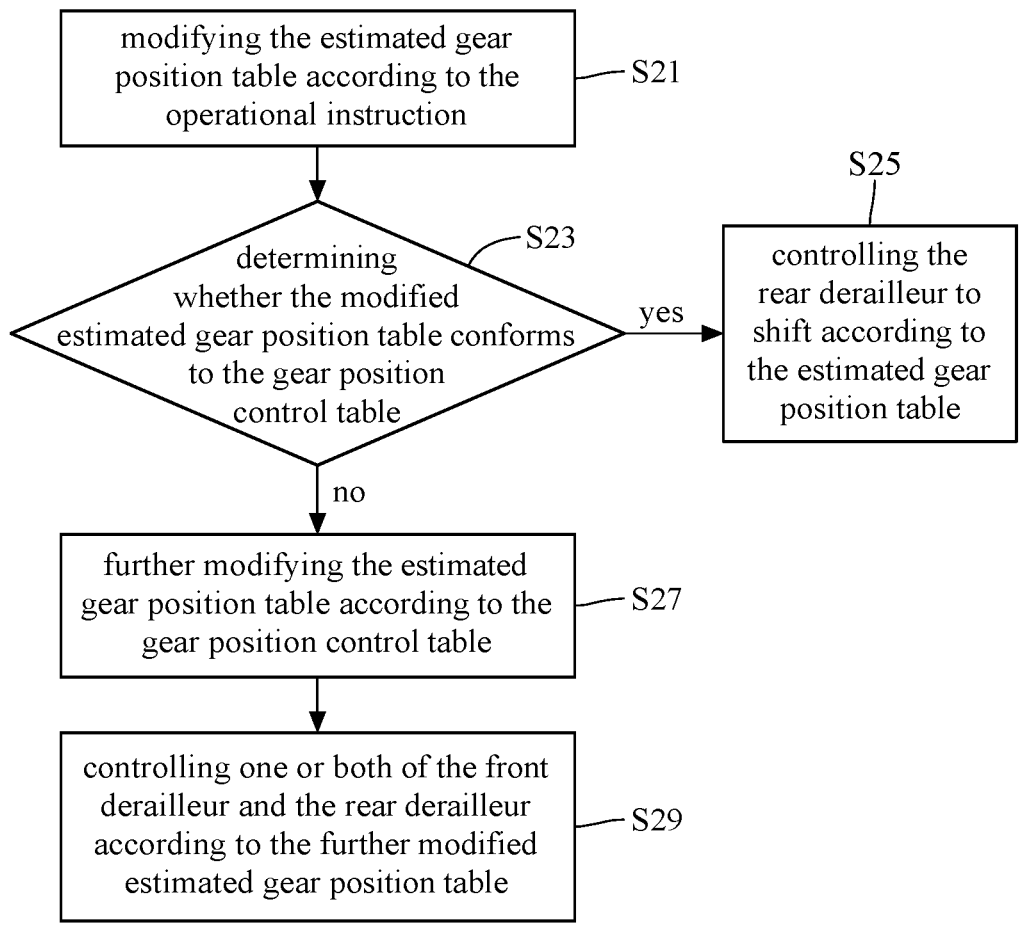
FIG. 4 is a flow chart of a method for controlling gear positions of derailleurs according to another embodiment of this disclosure.

In step S21 in FIG. 4, the controller 17 modifies the estimated gear position table according to the operational instruction from the operating device 15. More particularly, when the operational instruction comprises the shifting information of the rear derailleur 13, the controller 17 accordingly modifies the estimated rear gear position. As aforementioned, the shifting information of the rear derailleur 13 can comprise a specified target rear gear position or a rear gear position switching instruction. In an example, when the shifting information of the rear derailleur 13 indicates that the target rear gear position is rear gear positions 5, the controller 17 changes the content of the estimated rear gear position to rear gear position 5; in another example, when the shifting information of the rear derailleur 13 comprises a switching instruction of taking one rear gear position backward and the original content of the estimated rear gear position is rear gear position 6, the controller 17 changes the content of the estimated rear gear position to rear gear position 5. On the other hand, when the operational instruction comprises the shifting information of the front derailleur 11, the controller 17 can change the content of the estimated front gear position to front gear position candidates corresponding to the shifting information. As aforementioned, the shifting information of the front derailleur 11 can comprise a specified target sprocket or a sprocket switching instruction. In the example using Table 1 as the gear position control table, when the shifting information of the front derailleur 11 indicates the target sprocket is the first sprocket, the controller 17 changes the content of the estimated front gear position to front gear position candidates 1-3; when the shifting information of the front derailleur 11 comprises a sprocket switching instruction and the original content of the estimated front gear position is front gear position 2, the controller 17 changes the content of the estimated front gear position to front gear position candidates 4-6.

In step S23, the controller 17 can determine whether the estimated gear position table that is modified by step S21 conforms to the gear position control table. More particularly, when merely the estimated rear gear position is changed, the controller 17 determines whether the estimated front gear position has a matching relationship with the changed estimated rear gear position according to the gear position control table. When the determined result is positive ("yes"), the controller 17 performs step S25: controlling the rear derailleur 13 to shift according to the estimated gear position table; when the determined result is negative ("no"), the controller 17 performs step S27: further modifying the estimated gear position table according to the gear position control table, and the details of the method of further modifying are described later. On the other hand, when the content of the estimated front gear position is changed to comprise front gear position candidates (at this time, the estimated rear gear position may be unchanged or changed), the controller 17 determines that the estimated gear position table does not conform to the gear position control table and performs step S27.

In step S27, the controller 17 can further modify the estimated gear position table according to the gear position control table. More particularly, when merely the estimated rear gear position is changed, the controller 17 searches for the front gear position that has a matching relationship with the changed estimated rear gear position and belongs to the same sprocket as the estimated front gear position from the estimated gear position table in order to change the estimated front gear position. In the example using Table 1 as the gear position control table, when the content of the estimated rear gear position is changed from rear gear position 3 to rear gear position 4 and the content of the estimated front gear position is front gear position 3 originally, the controller 17 changes the content of the estimated front gear position to front gear position 2. Moreover, when the content of the estimated front gear position is changed to comprise front gear position candidates, regardless of whether the estimated rear gear position is changed, the controller 17 refers to the estimated gear position table to select the front gear position that has a matching relationship with the estimated rear gear position or the changed estimated rear gear position from the front gear position candidates to change the estimated front gear position. In the example using Table 1 as the gear position control table, when the content of the estimated front gear position comprises front gear position candidates 1-3 and the content of the estimated rear gear position is rear gear position 4, the controller 17 further changes the content of the estimated front gear position to front gear position 2.

In step S29, the controller 17 can control one or both of the front derailleur 11 and the rear derailleur 13 according to the estimated gear position table further modified by step S27; that is, the controller 17 can instruct the derailleur whose gear position is changed to shift. The control signal used by the controller 17 to control the derailleur to shift can indicate a specified gear position or the number of gear positions for shifting forward or backward, which is not limited in this disclosure.

Figure 5:
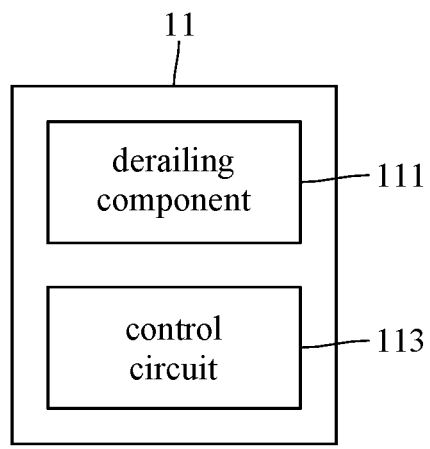
FIG. 5 is a functional block diagram of a front derailleur of a derailleur shifting system according to an embodiment of this disclosure.

In addition to performing the control methods described in the above embodiments, the controller 17 can capture the shifting information contained in the operational instruction as two control signals directly or after initially processed, wherein the two control signals are respectively a first control signal and a second control signal, and transmit the first control signal to the front derailleur 11 and transmit the second control signal to the rear derailleur 13. The first control signal is associated with the second control signal, and particularly, the first control signal and the second control signal comprise the same shifting information. For a further explanation of this embodiment, please refer to FIG. 1 and FIG. 5 together, wherein FIG. 5 is a functional block diagram of the front derailleur 11 of the derailleur shifting system 1 according to an embodiment of this disclosure. In this embodiment, in addition to the aforementioned derailing component 111, the front derailleur 11 of the derailleur shifting system 1 further comprises a control circuit 113. The control circuit 113 is connected with the derailing component 111, and configured to selectively control the derailing component 111 to shift according to the first control signal and the gear position control table. Similar to the aforementioned embodiments, this gear position control table can comprise matching relationships between front gear positions of the front derailleur 11 (its derailing component 111) and rear gear positions of the rear derailleur 13. More particularly, the matching relationships indicate the combinations of the front gear positions and the rear gear positions that do not cause chain wear, as shown in Table 1 as above listed. The gear position control table can be stored in a non-volatile memory in the control circuit 113 or a non-volatile memory connected with the control circuit 113 in the system.

In this embodiment, the controller 17 can merely serve as an intermediary device for transmitting the operational instruction, that is, generate a first and second control signals each of which is identical to the operational instruction; or, the controller 17 can preprocess the operational instruction to capture the shifting information it contains, or convert the signal format of the operational instruction, and then generate the a first and second control signals each of which contains the captured shifting information or the converted operational instruction. Then, the controller 17 transmits the first control signal and the second control signal to the front derailleur 11 and the rear derailleur 13 respectively, and the task of referring to the gear position control table to determine the target gear positions is performed by the control circuit 113. More particularly, the control circuit 113 can perform the control method similar to that shown in FIG. 3. Please refer to FIG. 1, FIG. 5 and FIG. 6, wherein FIG. 6 is a flow chart of a method for controlling gear positions of derailleurs according to yet another embodiment of this disclosure.

Figure 6:
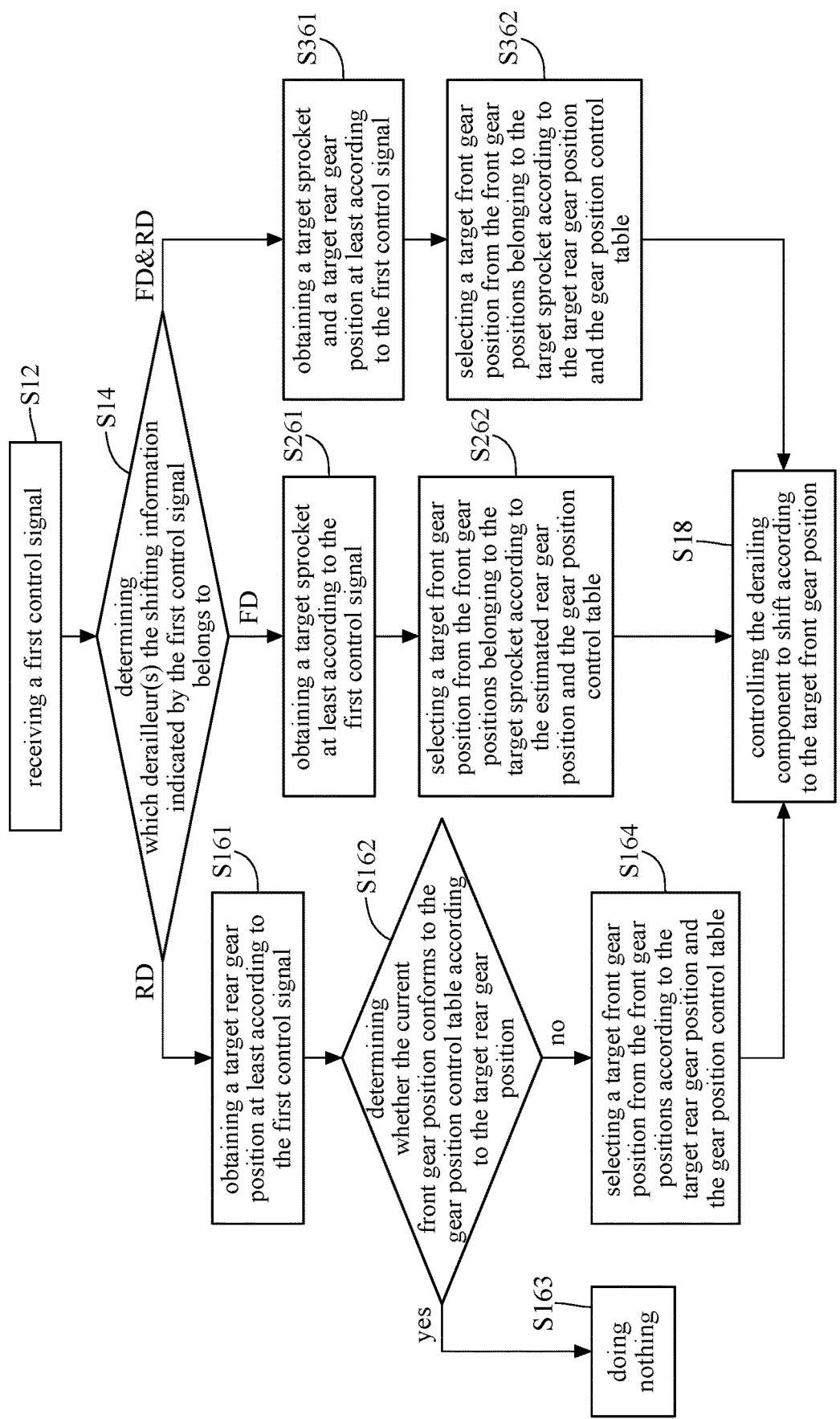
FIG. 6 is a flow chart of a method for controlling gear positions of derailleurs according to yet another embodiment of this disclosure.

In steps S12 and S14 in FIG. 6, the control circuit 113 receives the first control signal from the controller 17, and determines whether the first control signal indicates shifting information of the front derailleur 11, the rear derailleur 13 or both of them. For different determined results, the control circuit 113 can perform different determining procedures of the target front gear position correspondingly. As shown in FIG. 6, when the first control signal indicates the shifting information of the rear derailleur 13 (determined result RD), the corresponding determining procedure of the target front gear position can comprise steps S161-S164; when the first control signal indicates the shifting information of the front derailleur 11 (determined result FD), the corresponding determining procedure of the target front gear position can comprise steps S261-S262; and when the first control signal indicates the shifting information of both the front derailleur 11 and the rear derailleur 13 (determined result FD&RD), the corresponding determining procedure of the target front gear position can comprise steps S361-S362. After determining the target front gear position, in step S18, the control circuit 113 controls the derailing component 111 to shift according to the determined target front gear position. The control signal used by the control circuit 113 to control the derailing component 111 to shift can indicate a specified gear position or the number of gear positions for shifting forward or backward, which is not limited in this disclosure. Each of these determining procedures of the target front gear position is further described in the following.

In step S161 in the determining procedure of the target front gear position corresponding to the shifting information of the rear derailleur 13, the control circuit 113 can obtain a target rear gear position at least according to the first control signal. As aforementioned, the shifting information of the rear derailleur 13 can comprise a specified target rear gear position or a rear gear position switching instruction. When the first control signal indicates a specified target rear gear position, the control circuit 113 can obtain the target rear gear position therefrom. When the first control signal indicates a rear gear position switching instruction, control circuit 113 can obtain the target rear gear position according to this rear gear position switching instruction and an estimated rear gear position of the rear derailleur 13. More particularly, the control circuit 113 can have a non-volatile memory to record the estimated rear gear position. The estimated rear gear position can be set to a default value when the system leaves the factory, and represent the gear position of the rear derailleur 13 that is preset when the system leaves the factory. The control circuit 113 can change the value of the estimated rear gear position according to the received control signal after leaving the factory.

In step S162, the control circuit 113 determines whether the current front gear position of the front derailleur 11 conforms to the gear position control table according to the target rear gear position. More specifically, the current front gear position can be an estimated front gear position, and its setting and storage location have the same principles as those of the estimated rear gear position as aforementioned; or, the current front gear position can be the actual front gear position that corresponds to the derailing component 111 and is obtained from the derailing component 111 by the control circuit 13 at that time. For example, the control circuit 113 can have a gear position detector to obtain the front gear position to which the derailing component 11 actually corresponds. The control circuit 113 can determine whether the current front gear position is the front gear position having a matching relationship with the rear gear position indicated by the target rear gear position according to the gear position control table. When the determined result is positive ("yes"), indicating that the current front gear position matches the target rear gear position, the control circuit 113 does nothing (step S163) without adjusting the front derailleur 11. When the determined result is negative ("no"), the control circuit 113 selects a target front gear position from the front gear positions according to the target rear gear position and the gear position control table (step S164). In particular, the control circuit 113 preferably selects the front gear position that belongs to the same sprocket as the current front gear position to be the target front gear position. The operation principles of the above steps S161-S164 are the same as those of the steps S151-S154 performed by the controller 17 as aforementioned, so the example with actual values are not described here.

In the determining procedure of the target front gear position corresponding to the shifting information of the front derailleur 11, the control circuit 113 can obtain a target sprocket at least according to the first control signal (step S261). As aforementioned, the shifting information of the front derailleur 11 can comprise a specified target sprocket or a sprocket switching instruction. When the first control signal indicates a target sprocket, the control circuit 113 can obtain the target sprocket therefrom. When the first control signal indicates a sprocket switching instruction, the control circuit 113 can obtain the target sprocket according to this sprocket switching instruction and the current front gear position of the derailleur 11. In step S262, the control circuit 113 selects a target front gear position from the front gear positions belonging to the target sprocket according to the estimated rear gear position and the gear position control table. More specifically, the control circuit 113 searches for the front gear position that belongs to the target sprocket and has a matching relationship with the estimated rear gear position from the gear position control table, and sets this front gear position as the target front gear position. In particular, the operation principles of the above steps S261-S262 are the same as those of the steps S251-S252 performed by the controller 17 as aforementioned, so the example with actual values are not described here.

In the determining procedure of the target front gear position corresponding to the shifting information of the front derailleur 11 and the rear derailleur 13, the control circuit 113 can obtain a target sprocket and a target rear gear position at least according to the first control signal (step S361). As aforementioned, the shifting information of the front derailleur 11 can indicate a specified target sprocket or a sprocket switching instruction, and the shifting information of the rear derailleur 13 can indicate a specified target rear gear position or a rear gear position switching instruction. More specifically, when the shifting information of the front derailleur 11 in the first control signal indicates a target sprocket, the control circuit 113 can obtain the target sprocket therefrom; when the shifting information of the front derailleur 11 in the first control signal indicates a sprocket switching instruction, the control circuit 113 can obtain the target sprocket according to this sprocket switching instruction and the current front gear position of the front derailleur 11; when the shifting information of the rear derailleur 13 in the first control signal indicates a target rear gear position, the control circuit 113 can obtain the target rear gear position therefrom; and when the shifting information of the rear derailleur 13 in the first control signal indicates a rear gear position switching instruction, the control circuit 113 can obtain the target rear gear position according to this rear gear position switching instruction and the estimated rear gear position in the estimated gear position table. The examples of obtaining the target sprocket/target rear gear position according to the switching instruction and the current front gear position/the estimated rear gear position have the same principles as the examples listed in the description of the above two determining procedures of the target front gear position, so they are not repeated here. In step S362, the control circuit 113 selects a target front gear position from the front gear positions belonging to the target sprocket according to the target rear gear position and the gear position control table. More specifically, the control circuit 113 searches for the front gear position that belongs to the target sprocket and has a matching relationship with the target rear gear position from the gear position control table, and sets this front gear position as the target front gear position.

It should be noted that although the above embodiment exemplarily describes that the control circuit 113 can perform three types of determining procedures of the target front gear position, in other embodiments, the control circuit 113 can be set to merely perform one or two of the three types of determining procedures of the target front gear position. In other words, the control circuit 113 can merely be triggered by one or two types of first control signals to perform the determining procedure of the target front gear position. In an embodiment where merely one type of determining procedure of the target front gear position can be performed, the control circuit 113 does not perform the aforementioned step S14 but performs a step of determining whether the first control signal comprises the shifting information corresponding to the determining procedure of the target front gear position. The control circuit 113 performs the determining procedure of the target front gear position when the determined result is positive, and does nothing when the determined result is negative.

By the above description, the derailleur shifting system 1 can control the front and rear derailleurs 11 and 13 to shift according to the matching relationships between the front and rear gear positions, without waiting for the rear derailleur 13 to return the actual gear position, when receiving an operational instruction. Therefore, it may avoid chain wear caused since the rear derailleur 13 shifts first and then returns the actual gear position. Moreover, it is not necessary to set a gear position in the aforementioned derailleur shifting system 1 detector for returning the actual gear positions, and accordingly, the hardware cost of the system may be reduced.

Figure 7:
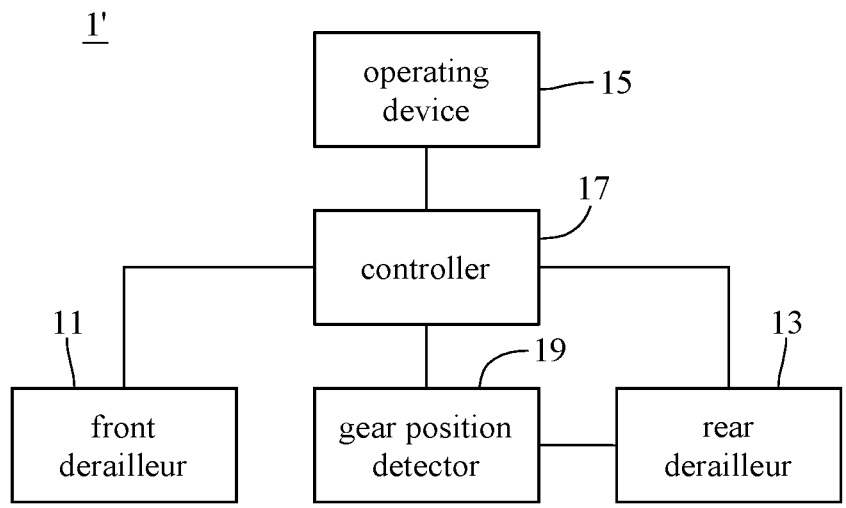
FIG. 7 is a functional block diagram of a derailleur shifting system according to another embodiment of this disclosure.

This disclosure also provides another type of derailleur shifting system. Please refer to FIG. 7 that is a functional block diagram of a derailleur shifting system 1' according to another embodiment of this disclosure. As shown in FIG. 7, similar to the derailleur shifting system 1 in FIG. 1 as aforementioned, the derailleur shifting system 1' comprises a front derailleur 11, a rear derailleur 13, an operating device 15 and a controller 17, and is also applied to a bicycle. The connections between the above devices, the operation of each device and the location of each device on a bicycle are all as described in the embodiments associated with the derailleur shifting system 1. More particularly, the controller 17 can also perform the control methods shown in FIG. 3 and FIG. 4. Moreover, the front derailleur 11 of the derailleur shifting system 1' can comprise the control circuit 113 shown in FIG. 5, and the control circuit 113 can perform the control method shown in FIG. 6. The related details are as described in the aforementioned embodiments, so they are not repeated here.

In addition to the above devices, the derailleur shifting system 1' further comprises a gear position detector 19 with wired or wireless connections with the rear derailleur 13 and the controller 17. For example, the gear position detector 19 is an encoder and can obtain an actual gear position of the rear derailleur 13. The gear position detector 19 and the rear derailleur 13 can be integrated and disposed on/in the cogset of the bicycle or other parts of the bicycle, which is not limited in this disclosure. When the connection between the controller 17 and the front derailleur 11 or the connection between the controller 17 and the rear derailleur 13 is broken, the controller 17 may continue receiving operational instructions and controlling the derailleur whose connection with the controller 17 is not broken. As a result, the relationship between the derailleur with the unbroken connection and the derailleur with the broken connection must not be matching and chain wear is caused. The gear position detector 19 can regularly provide the actual gear position of the rear derailleur 13 (hereinafter referred to as "actual rear gear position") to the controller 17, or provide the actual rear gear position to the controller 17 when the rear derailleur 13 is controlled to shift. Or, when the controller 17 determines that its connection with the derailleur is changed from a broken status to an unbroken status, the controller 17 can request the actual rear gear position from the gear position detector 19. More particularly, when the connection between the derailleur and the controller 17 is restored, the derailleur can generate a feedback signal and transmit it to the controller 17, and the controller 17 can then determine that their connection is restored.

Figure 8:
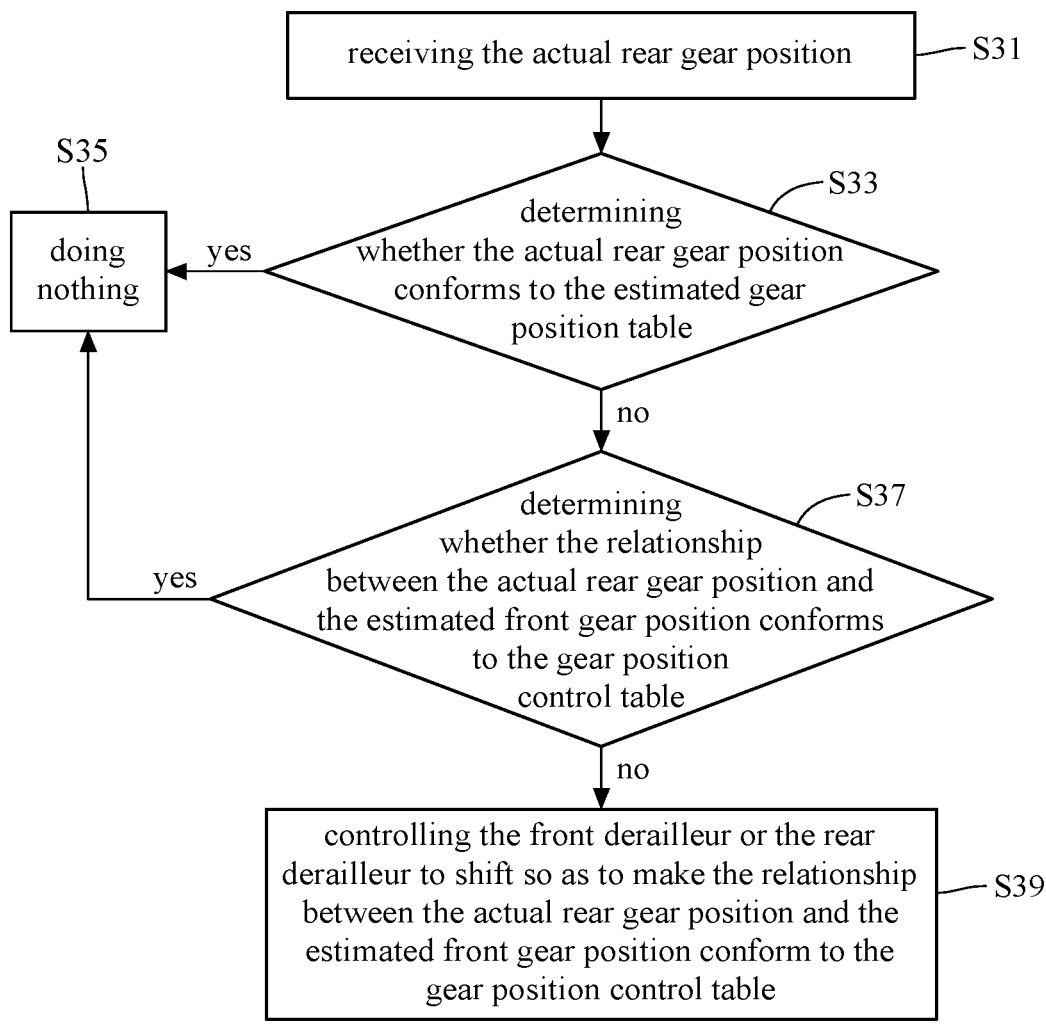
FIG. 8 is a flow chart of a method for controlling gear positions of derailleurs according to yet another embodiment of this disclosure.

Please refer to FIG. 7 and FIG. 8 together to describe the control method performed when the derailleur shifting system 1' receives the actual rear gear position, wherein FIG. 8 is a flow chart of a method for controlling gear positions of derailleurs according to yet another embodiment of this disclosure. In step S31 and step S33, after receiving the actual rear gear position, the controller 17 can determine whether the actual rear gear position conforms to the estimated gear position table. More particularly, the controller 17 can determine whether the actual rear gear position is identical to the estimated rear gear position in the estimated gear position table. If they are identical, the actual rear gear position conforms to the estimated gear position table; if they are not identical, the actual rear gear position does not conform to the estimated gear position table. When the determined result of step S33 indicates conformity ("yes"), the controller 17 does nothing in step S35. When the determined result of step S33 indicates nonconformity ("no"), the controller 17 can further determine whether the relationship between the actual rear gear position and the estimated front gear position conforms to the gear position control table in step S37, that is, the controller 17 can determine whether the actual rear gear position matches the estimated front gear position, wherein the further explanation of this determining step has the same principle as that in the aforementioned embodiment, so it is not repeated here. When the determined result of step S37 indicates conformity ("yes"), the controller 17 does nothing. When the determined result of step S37 indicates nonconformity ("no"), the controller 17 can control the front derailleur 11 or the rear derailleur 13 to shift so as to make the relationship between the actual rear gear position and the estimated front gear position conform to the gear position control table in step S39.

More particularly, after the control method of FIG. 3 or FIG. 4 as aforementioned, the relationship between the estimated front gear position and the estimated rear gear position in the estimated gear position table of the controller 17 should conform to one of the matching relationships in the gear position control table. Therefore, when the controller 17 determines that the actual rear gear position does not match the estimated front gear position, the controller 17 can control the rear derailleur 13 to shift to the estimated rear gear position, so as to make the actual rear gear position match the estimated front gear position; or, the controller 17 can control the front derailleur 11 to shift according to the actual rear gear position and the gear position control table, and more specifically, the controller 17 can search for the front gear position that belongs to the same sprocket as the estimated front gear position and has a matching relationship with the actual rear gear position from the gear position control table, and instruct the front derailleur 11 to shift to this front gear position.

Moreover, in an embodiment where the front derailleur 11 of the derailleur shifting system 1' comprises the control circuit 113 as shown in FIG. 5, the controller 17 can merely transfer the actual rear gear position to the control circuit 113 of the front derailleur 11 rather than perform the control method of FIG. 8 as aforementioned. In this embodiment, the control circuit 113 can perform a control method similar to that of FIG. 8, with the difference that the control circuit 113 uses the current front gear position (which can be the estimated front gear position or the actual front gear position as aforementioned) of the front derailleur 11 to perform the determining step and selectively controls the derailing component 111 to shift according to the determined result, so as to make the relationship between the actual rear gear position and the current front gear position conform to the gear position control table. The detailed determining method has the same principle as that of FIG. 8 as aforementioned, so it is not repeated here.

Figure 9A:
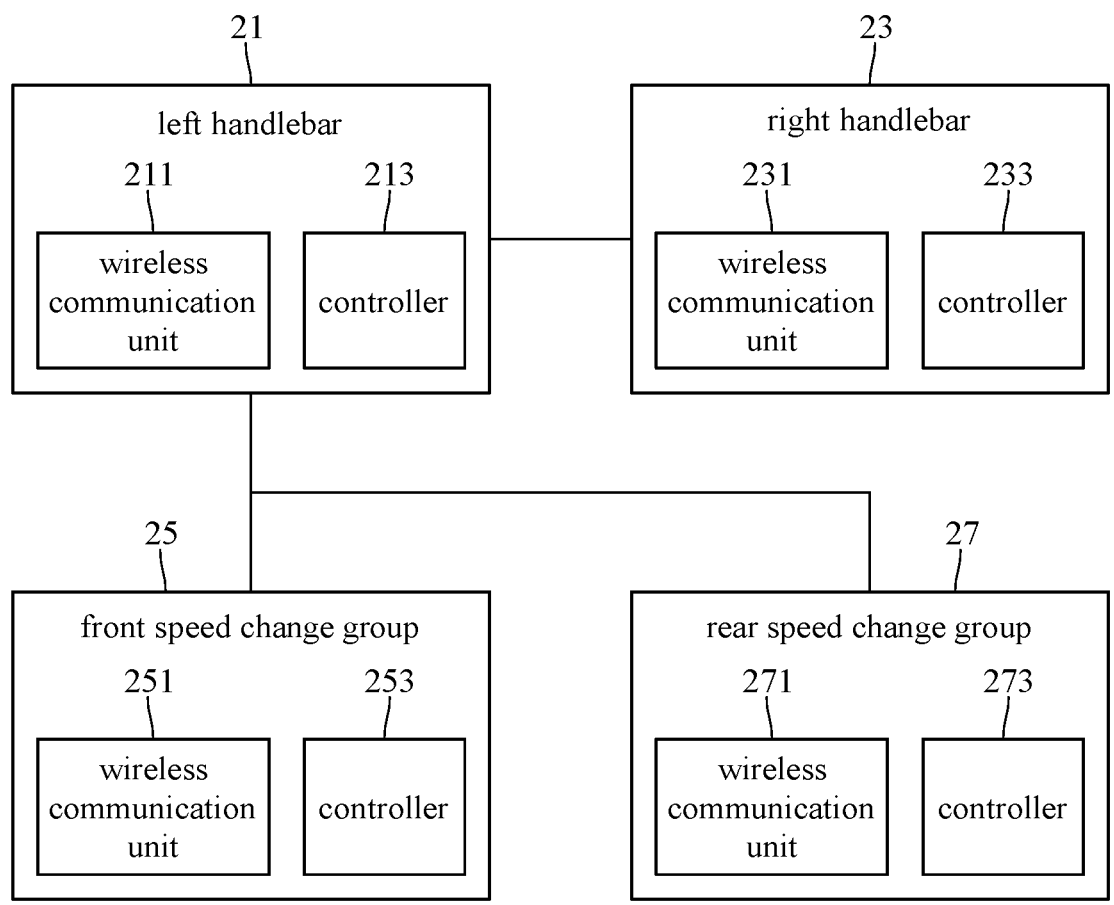
FIGS. 9A-9C are schematic diagrams of signal transmission of bicycles to which a derailleur shifting system is applied according to multiple embodiments of this disclosure.
Figure 9B:
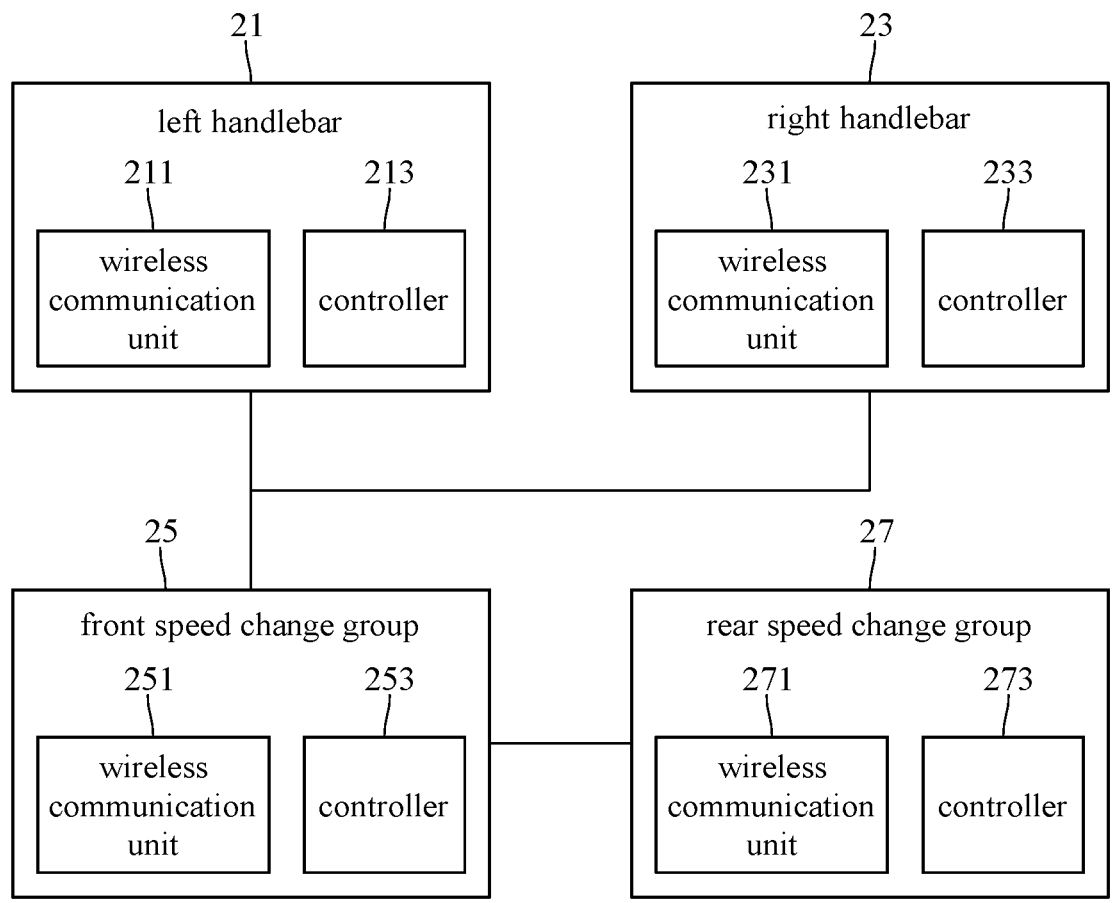
Figure 9C:
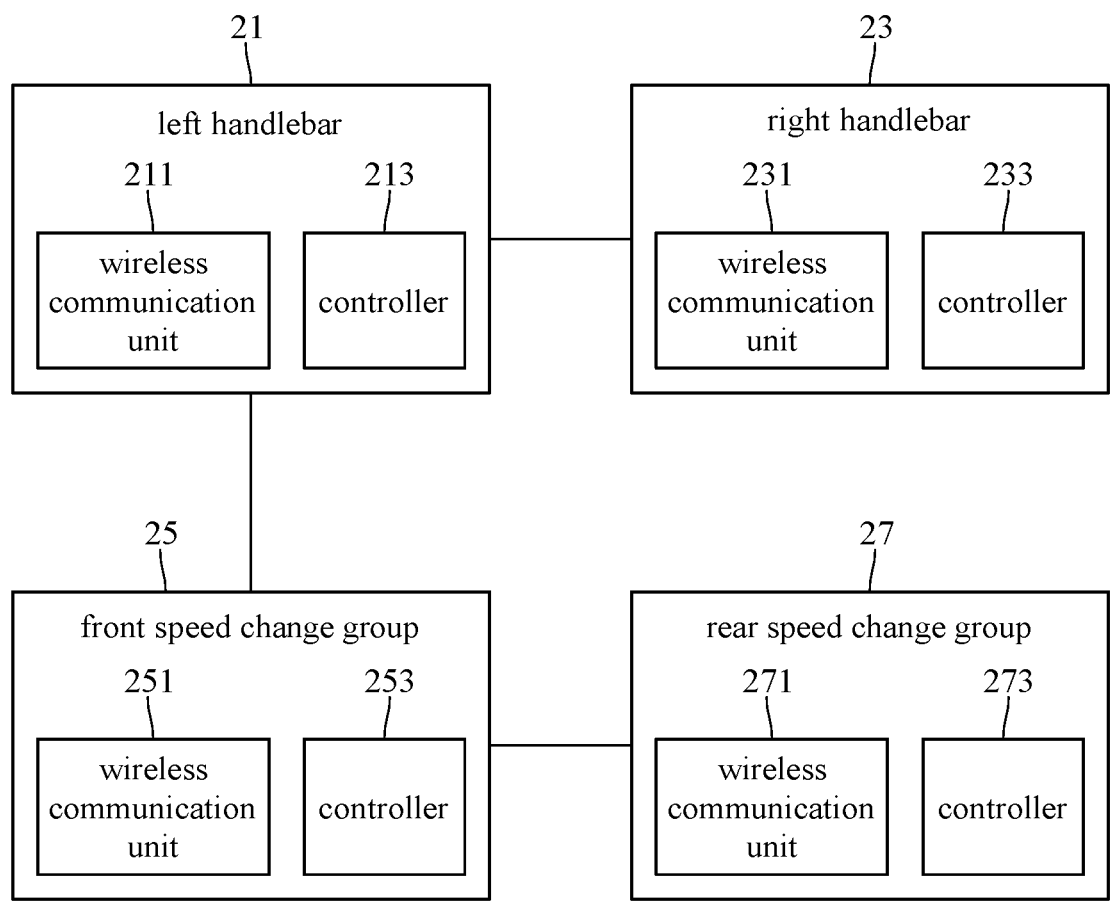

The above embodiments at least provide the derailleur shifting system comprising a controller (as shown in FIG. 1, hereinafter referred to as the first derailleur shifting system), the derailleur shifting system comprising a controller and a front derailleur with a control circuit (as shown in FIG. 1 and FIG. 5, hereinafter referred to as the second derailleur shifting system), the derailleur shifting system comprising a controller and a gear position detector (as shown in FIG. 7, hereinafter referred to as the third derailleur shifting system) and the derailleur shifting system comprising a controller, a front derailleur with a control circuit, and a gear position detector (as shown in FIG. 7 and FIG. 5, hereinafter referred to as the fourth derailleur shifting system). For a further explanation of the bicycles applicable to the above systems, please refer to FIGS. 9A-9C together, wherein FIG. 9A-9C are schematic diagrams of signal transmission of bicycles 2, 2' and 2" according to multiple embodiments of this disclosure. As shown in FIGS. 9A-9C, each of the bicycle 2, 2' and 2" comprises a left handlebar 21, a right handlebar 23, a front speed change group 25 and a rear speed change group 27. It should be noted that the front speed change group 25 and the rear speed change group 27 shown in FIGS. 9A-9C respectively refer to the area where the sprocket group is disposed on/in the bicycle frame (e.g. the frame area connected to the pedal) and the area where the cogset is disposed on/in the bicycle frame (e.g. the frame area connected to the rear wheel). The mechanisms of these components and the mechanical connections between one another can be the same as those of a general bicycle or designed according to actual requirements, and they are not limited in this disclosure.

In the bicycle 2 shown in FIG. 9A, the right handlebar 23 can communicate with the left handlebar 21, and the left handlebar 21 can communicate with the front speed change group 25 and the rear speed change group 27 respectively. The above-mentioned first, second, third and fourth derailleur shifting systems are applicable to the bicycle 2 shown in FIG. 9A. For the first and second derailleur shifting systems, the front derailleur can be disposed in the front speed change group 25 for slightly adjusting the position of the chain or switching the chain to mesh with different sprocket; the rear derailleur can be disposed in the rear speed change group 27 for switching the chain to mesh with different sprocket; the operating device can be disposed on/in the right handlebar 23, or comprise two operating components respectively disposed on/in the left and right handlebars 21 and 23; the controller can be disposed on/in the left handlebar 21 or the right handlebar 23. For the third and fourth derailleur shifting systems, the suitable setting locations of the front derailleur, the rear derailleur, the operating device and the controller are the same as those for the first and second derailleur shifting systems, and the gear position detector is disposed in the rear speed change group 27.

Moreover, as shown in FIG. 9A, the left handlebar 21, the right handlebar 23, the front speed change group 25 and the rear speed change group 27 of the bicycle 2 can also comprise wireless communication units 211, 231, 251 and 271 and controllers 213, 233, 253 and 273 respectively. For example, each of the wireless communication units 211, 231, 251 and 271 can be a signal transceiver using a wireless communication technology such as infrared communication technology (e.g. RC-5, VFIR, UFIR, etc.), Bluetooth, Bluetooth Low Energy, ZigBee, ANT, wireless LAN, etc. The controllers 213, 233, 253 and 273 can connect with each other using a wired or wireless method and together form the aforementioned controller of the first, second, third or fourth derailleur shifting system. It should be noted that the wireless communication units 211, 231, 251 and 271 illustrated in FIG. 9A are optional components, the controllers 213 and 233 can be disposed alternatively, and the controllers 253 and 273 are optional components.

In the bicycle 2' shown in FIG. 9B, the left handlebar 21 and the right handlebar 23 can each communicate with the front speed change group 25, and the front speed change group 25 can communicate with the rear speed change group 27. The above-mentioned first, second, third and fourth derailleur shifting systems are applicable to the bicycle 2' shown in FIG. 9B. For the first and second derailleur shifting systems, the front derailleur can be disposed in the front speed change group 25 for slightly adjusting the position of the chain or switching the chain to mesh with different sprocket; the rear derailleur can be disposed in the front speed change group 27 for switching the chain to mesh with different sprocket; the operating device comprises two operating components respectively disposed on/in the left and right handlebars 21 and 23; the controller is disposed in the front speed change group 25. For the third and fourth derailleur shifting systems, the suitable setting locations of the front derailleur, the rear derailleur, the operating device and the controller are the same as those for the first and second derailleur shifting systems, and the gear position detector is disposed in the rear speed change group 27.

Moreover, as shown in FIG. 9B, the left handlebar 21, the right handlebar 23, the front speed change group 25 and the front speed change group 27 of the bicycle 2' can also comprise wireless communication units 211, 231, 251 and 271 and controllers 213, 233, 253 and 273 respectively. For example, each of the wireless communication units 211, 231, 251 and 271 can be a signal transceiver using a wireless communication technology such as infrared communication technology (e.g. RC-5, VFIR, UFIR, etc.), Bluetooth, Bluetooth Low Energy, ZigBee, ANT, wireless LAN, etc. The controllers 213, 233, 253 and 273 can connect with each other using a wired or wireless method and together form the aforementioned controller of the first, second, third or fourth derailleur shifting system. It should be noted that the wireless communication units 211, 231, 251 and 271 illustrated in FIG. 9B are optional components, and the controllers 213, 233 and 273 are also optional components.

In the bicycle 2" shown in FIG. 9C, the right handlebar 23 can communicate with the left handlebar 21, the left handlebar 21 can communicate with the front speed change group 25, and the front speed change group 25 can communicate with the rear speed change group 27. The above-mentioned first, second, third and fourth derailleur shifting systems are applicable to the bicycle 2" shown in FIG. 9C. For the first and second derailleur shifting systems, the front derailleur can be disposed in the front speed change group 25 for slightly adjusting the position of the chain or switching the chain to mesh with different sprocket; the rear derailleur can be disposed in the front speed change group 27 for switching the chain to mesh with different sprocket; the operating device can be disposed on/in the right handlebar 23, or comprise two operating components respectively disposed on/in the left and right handlebars 21 and 23; the controller is disposed on/in the left handlebar 21 or in the front speed change group 25. For the third and fourth derailleur shifting systems, the suitable setting locations of the front derailleur, the rear derailleur, the operating device and the controller are the same as those for the first and second derailleur shifting systems, and the gear position detector is disposed in the rear speed change group 27.

Moreover, as shown in FIG. 9C, the left handlebar 21, the right handlebar 23, the front speed change group 25 and the front speed change group 27 of the bicycle 2" can also comprise wireless communication units 211, 231, 251 and 271 and controllers 213, 233, 253 and 273 respectively. For example, each of the wireless communication units 211, 231, 251 and 271 can be a signal transceiver using a wireless communication technology such as infrared communication technology (e.g. RC-5, VFIR, UFIR, etc.), Bluetooth, Bluetooth Low Energy, ZigBee, ANT, wireless LAN, etc. The controllers 213, 233, 253 and 273 can connect with each other using a wired or wireless method and together form the aforementioned controller of the first, second, third or fourth derailleur shifting system. It should be noted that the wireless communication units 211, 231, 251 and 271 illustrated in FIG. 9C are optional components, the controllers 213 and 253 can be disposed alternatively, and the controllers 233 and 273 are optional components.

In view of the above statement, when the derailleur shifting system provided in this disclosure receives an operational instruction, it may immediately refer to the matching relationships between the front gear positions and the rear gear positions to control the front derailleur and/or the rear derailleur to shift, without waiting for the rear derailleur to return the actual gear position. Therefore, it may achieve a real-time gear position control, and avoid chain wear caused since the rear derailleur shifts first and then returns the actual gear position. Moreover, this disclosure also provides a derailleur shifting system with a gear position detector, and when operating or restored from disconnection, this derailleur shifting system can determine the actual gear position of the rear derailleur, and refer to the matching relationships between the front gear positions and the rear gear positions to control the front derailleur and/or the rear derailleur to shift to the gear position that may not cause chain wear.

What is claimed is:

1. A derailleur shifting system, comprising:
  a front derailleur configured to be controlled to shift among a plurality of front gear positions;
  a rear derailleur configured to be controlled to shift among a plurality of rear gear positions;
  an operating device configured to generate an operational instruction associated with one or both of the front derailleur and the rear derailleur; and
  a controller connected with the operating device, the front derailleur and the rear derailleur, and configured to control one or both of the front derailleur and the rear derailleur to shift according to the operational instruction, an estimated gear position table and a gear position control table;
  wherein the estimated gear position table comprises an estimated front gear position of the front derailleur and an estimated rear gear position of the rear derailleur, and the gear position control table comprises matching relationships between the plurality of front gear positions of the front derailleur and the plurality of rear gear positions of the rear derailleur.

2. The derailleur shifting system according to claim 1, wherein controlling one or both of the front derailleur and the rear derailleur to shift according to the operational instruction, the estimated gear position table and the gear position control table performed by the controller comprises:
  modifying the estimated gear position table according to the operational instruction;
  when the modified estimated gear position table does not conform to the gear position control table, further modifying the estimated gear position table; and controlling one or both of the front derailleur and the rear derailleur to shift according to the further modified estimated gear position table.

3. The derailleur shifting system according to claim 1, wherein the operational instruction indicates shifting information of the rear derailleur, and controlling one or both of the front derailleur and the rear derailleur to shift according to the operational instruction, the estimated gear position table and the gear position control table performed by the controller comprises:
obtaining a target rear gear position at least according to the operational instruction, wherein the target rear gear position is one of the plurality of rear gear positions;
when determining that the estimated front gear position does not conform with the gear position control table according to the target rear gear position, selecting a target front gear position from the plurality of front gear positions according to the target rear gear position and the gear position control table; and
controlling the front derailleur to shift according to the target front gear position, and controlling the rear derailleur to shift according to the target rear gear position.

4. The derailleur shifting system according to claim 3, wherein the shifting information comprises a rear gear position switching instruction, and the controller is further configured to obtain the target rear gear position according to the rear gear position switching instruction and the estimated rear gear position.

5. The derailleur shifting system according to claim 1, wherein the operational instruction indicates shifting information of the front derailleur, and controlling one or both of the front derailleur and the rear derailleur to shift according to the operational instruction, the estimated gear position table and the gear position control table performed by the controller comprises:
obtaining a target sprocket at least according to the operational instruction;
selecting a target front gear position from the plurality of front gear positions according to the target sprocket, the estimated rear gear position and the gear position control table; and
controlling the front derailleur to shift according to the target front gear position.

6. The derailleur shifting system according to claim 5, wherein the shifting information comprises a sprocket switching instruction, and the controller is further configured to obtain the target sprocket according to the sprocket switching instruction and the estimated front gear position.

7. The derailleur shifting system according to claim 1, wherein the operational instruction indicates shifting information of the front derailleur and shifting information of the rear derailleur, and controlling one or both of the front derailleur and the rear derailleur to shift according to the operational instruction, the estimated gear position table and the gear position control table performed by the controller comprises:
obtaining a target sprocket and a target rear gear position at least according to the operational instruction, wherein the target rear gear position is one of the plurality of rear gear positions;
selecting a target front gear position from the plurality of front gear positions according to the target sprocket, the target rear gear position and the gear position control table; and
controlling the front derailleur to shift according to the target front gear position, and controlling the rear derailleur to shift according to the target rear gear position.

8. The derailleur shifting system according to claim 7, wherein the shifting information of the front derailleur comprises a sprocket switching instruction, the shifting information of the rear derailleur comprises a rear gear position switching instruction, and the controller is further configured to obtain the target sprocket according to the sprocket switching instruction and the estimated front gear position, and to obtain the target rear gear position according to the rear gear position switching instruction and the estimated rear gear position.

9. The derailleur shifting system according to claim 1, applied to a bicycle comprising a sprocket group and a chain, wherein the sprocket group comprises a first sprocket and a second sprocket, the chain is controlled by the front derailleur to switch to mesh with the first sprocket or the second sprocket, and the plurality of front gear positions comprises first gear positions belonging to the first sprocket and second gear positions belonging to the second sprocket.

10. The derailleur shifting system according to claim 1, wherein the controller is disposed on a handlebar of a bicycle.

11. The derailleur shifting system according to claim 1, wherein the controller and the front derailleur are integrated and disposed on a bicycle frame.

12. The derailleur shifting system according to claim 1, wherein the controller is connected, via wireless communication technology, with one or more of the operating device, the front derailleur and the rear derailleur.

13. The derailleur shifting system according to claim 1, further comprising a gear position detector that is connected with the controller and configured to detect an actual rear gear position of the rear derailleur, wherein when determining that the actual rear gear position does not conform to the estimated rear gear position or that a relationship between the actual rear gear position and the estimated front gear position does not conform to the gear position control table, the controller controls the front derailleur or the rear derailleur to shift so as to make the relationship conform to the gear position control table.

14. A derailleur shifting system, comprising:
a front derailleur configured to be controlled to shift among a plurality of front gear positions;
a rear derailleur configured to be controlled to shift among a plurality of rear gear positions;
an operating device configured to generate an operational instruction associated with one or both of the front derailleur and the rear derailleur; and
a controller connected with the operating device, the front derailleur and the rear derailleur, and configured to generate a first control signal and a second control signal, to transmit the first control signal to the front derailleur, and to transmit the second control signal to the rear derailleur;
wherein the front derailleur comprises:
a derailing component; and
a control circuit connected with the derailing component, and configured to selectively control the derailing component to shift at least according to the first control signal and a gear position control table;
wherein the gear position control table comprises matching relationships between the plurality of front gear positions of the front derailleur and the plurality of rear gear positions of the rear derailleur; and wherein when the operational instruction indicates shifting information of the rear derailleur, each of the first control signal and the second control signal comprises the shifting information, the rear derailleur shifts according to the second control signal, and the control circuit is configured to obtain a target rear gear position at least according to the first control signal, and to select a target front gear position from the plurality of front gear positions according to the target rear gear position and the gear position control table when determining that a current front gear position of the front derailleur does not conform to the gear position control table according to the target rear gear position, and to control the derailing component to shift according to the target front gear position, wherein the target rear gear position is one of the plurality of rear gear positions.

15. The derailleur shifting system according to claim 14, wherein the shifting information comprises a rear gear position switching instruction, and the control circuit is further configured to obtain the target rear gear position according to the rear gear position switching instruction and an estimated rear gear position of the rear derailleur.

16. The derailleur shifting system according to claim 14, wherein when the operational instruction indicates shifting information of the front derailleur, each of the first control signal and the second control signal comprises the shifting information, the control circuit is configured to obtain a target sprocket at least according to the first control signal, and to select the target front gear position from the plurality of front gear positions according to the target sprocket, an estimated rear gear position of the rear derailleur and the gear position control table, and to control the derailing component to shift according to the target front gear position.

17. The derailleur shifting system according to claim 16, wherein the shifting information comprises a sprocket switching instruction, and the control circuit obtains the target sprocket according to the sprocket switching instruction and the current front gear position of the front derailleur.

18. The derailleur shifting system according to claim 14, wherein when the operational instruction indicates shifting information of the front derailleur and shifting information of the rear derailleur, each of the first control signal and the second control signal comprises the shifting information of the front derailleur and the shifting information of the rear derailleur, and the control circuit is configured to obtain a target sprocket and the target rear gear position according to the first control signal, to select the target front gear position from the plurality of front gear positions according to the target sprocket, the target rear gear position and the gear position control table, and to control the derailing component to shift according to the target front gear position.

19. The derailleur shifting system according to claim 18, wherein the shifting information of the front derailleur comprises a sprocket switching instruction, the shifting information of the rear derailleur comprises a rear gear position switching instruction, and the control circuit is further configured to obtain the target sprocket according to the sprocket switching instruction and an estimated front gear position of the front derailleur, and to obtain the target rear gear position according to the rear gear position switching instruction and an estimated rear gear position of the rear derailleur.

20. The derailleur shifting system according to claim 14, applied to a bicycle comprising a sprocket group and a chain, wherein the sprocket group comprises a first sprocket and a second sprocket, the chain is controlled by the front derailleur to switch to mesh with the first sprocket or the second sprocket, and the plurality of front gear positions comprises first gear positions belonging to the first sprocket and second gear positions belonging to the second sprocket.

21. The derailleur shifting system according to claim 14, wherein the controller is disposed on a handlebar of a bicycle.

22. The derailleur shifting system according to claim 14, wherein the controller and the front derailleur are integrated and disposed on a bicycle frame.

23. The derailleur shifting system according to claim 14, wherein the controller is connected, via wireless communication technology, with one or more of the operating device, the front derailleur and the rear derailleur.

24. The derailleur shifting system according to claim 14, further comprising a gear position detector that is connected with the control circuit and configured to detect an actual rear gear position of the rear derailleur, wherein the control circuit is further configured to obtain the actual rear gear position, to control the front derailleur or the rear derailleur to shift when determining that the actual rear gear position does not conform to an estimated rear gear position or that a relationship between the actual rear gear position and an estimated front gear position does not conform to the gear position control table, so as to make the relationship conform to the gear position control table.

* * * * *